June 20, 1967 J. G. WILLIS 3,327,246
ELECTRICAL SIGNAL MODULATOR
Filed May 5, 1964
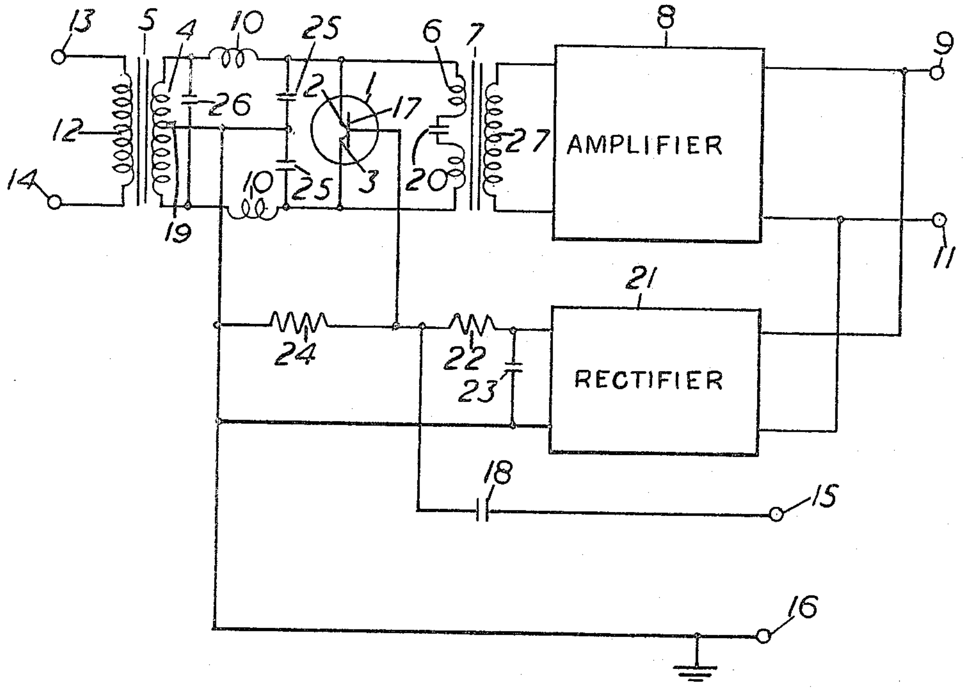
Inventor
JOHN G. WILLIS
By Percy P. Lantzy
Attorney 3,327,246
Patented June 20, 1967

3,327,246

ELECTRICAL SIGNAL MODULATOR

John Gordon Willis, London, England, assignor to International Standard Electric Corporation, New York, N.Y., a corporation of Delaware Filed May 5, 1964, Ser. No. 365,094
Claims priority, application Great Britain, May 10, 1963, 18,568/63
10 Claims. (Cl. 332—38)

This invention relates to electrical signal modulators and demodulators.

According to the invention there is provided an electrical signal modulator or demodulator having a circuit to connect a pair of input terminals to a pair of output terminals, said circuit including the collector-emitter impedance of a symmetrical transistor, means for applying a train of waves to said input terminals, means for applying a second train of waves to vary the collector-emitter impedance of the symmetrical transistor periodically so that the impedance of said circuit is varied accordingly, means to obtain a bias signal dependent upon the amplitude of an output signal from said pair of output terminals, and a circuit arrangement to control the relative duration of consecutive periods of said variation of the collector-emitter impedance of the transistor in response to the magnitude of the bias signal.

One embodiment of the invention is used in the drive stage of an independent sideband radio transmitter, where it is required to modulate a carrier wave by audio frequency signals, such as speech or music, in order to produce either a double or a single sideband signal with automatic gain control of the sideband signal levels. It is known to do this by using a separate modulator and a separate signal automatic gain controlled stage. In accordance with the invention the modulation and signal level gain control are effected in one stage.

The embodiment of the invention will now be described with reference to the accompanying drawing which shows symmetrical transistor 1 having two electrodes 2 and 3 connected through two identical inductors 10 to secondary winding 4 of transformer 5. Each of electrodes 2 and 3 may function either as the emitter or the collector of transistor 1 depending upon the polarity of the voltage applied between them. Electrodes 2 and 3 are also connected across primary winding 6 of a second transformer 7. Winding 6 is arranged in two halves connected in series by capacitor 20.

The terms "collector" and "emitter" are used in this specification in relation to the two electrodes of a symmetrical transistor (electrodes 2 and 3 in the case of transistor 1 in this embodiment of the invention) which operate either as the emitter or as the collector depending upon the polarity of the voltage applied between the electrodes.

Secondary winding 27 of transformer 7 is connected to the input terminals of amplifier 8. The output terminals of amplifier 8 are shown at 9 and 11. Primary winding 12 of transformer 5 is connected across terminals 13 and 14 which are in turn connected to a source of modulating signals (not shown).

A source of carrier wave signals (not shown) is connected between terminal 15 and terminal 16, which is grounded. Terminal 15 is coupled to base 17 of transistor 1 through capacitor 18, and terminal 16 is connected to the electrical center of winding 4 at tap 19. Two identical capacitors 25 are connected in series between electrodes 2 and 3. Capacitors 25, the center point of which is grounded, provide a low impedance path to ground for the carrier wave signal.

Output terminals 9 and 11 of amplifier 8 are connected to the input terminals of rectifier circuit 21. One of the output terminals of rectifier circuit 21 is connected via series resistor 22 to base 17 of transistor 1. A second output terminal of rectifier circuit 21 is grounded. Capacitor 23 is connected in shunt with the output terminals of rectifier circuit 21, and resistor 24 is connected between the junction of resistor 22 with base 17 and ground.

In the embodiment of the invention the modulating signals present at terminals 13 and 14 are audio frequency signals but other types of modulating signal could be used. The presence of the modulating signal at terminals 13 and 14 produces a balanced-to-ground voltage across secondary winding 4 of transformer 5 which is tuned by a fixed shunt capacitor 26 over a narrow band of frequencies compatible with the modulating frequency range.

Due to the presence of the carrier wave signal between terminals 15 and 16, a current at the carrier wave frequency flows between base 17 of transistor 1 and either one of electrodes 2 or 3, depending upon the polarity of each half-cycle of the modulating signal wave. A P-N-P type symmetrical transistor is used in the embodiment and the impedance between the emitter and collector is very low during half-cycles of the carrier wave which make terminal 15 negative with respect to ground, and is very high during the remaining half-cycles of the carrier wave. These conditions apply during both positive and negative half cycles of the modulating signal. The inductance of inductors 10 and the joint capacitance of capacitors 25 is such that the resonant frequency of the L.C. combination is equal to the carrier wave frequency.

The current through primary winding 6 of transformer 7 is effectively interrupted at the frequency of the carrier wave, which is 100 kc./s., and reverses direction between consecutive half-cycles of the modulating signal. When transistor 1 conducts energy is stored in inductors 10 and when the transistor is non-conducting a damped oscillation at the carrier wave frequency is set up. This oscillation exists for half a period of the carrier wave, before the transistor conducts again. No energy is lost as at this instant the voltage across capacitors 25 is zero. The current flowing in primary winding 6 consists mainly of the first order upper and lower sideband signals resulting from the modulation of the carrier wave by the modulating signal, the carrier wave component being substantially suppressed. Capacitor 20 is used to tune transformer 7 to accept the sideband signals and reject the modulating signal frequency.

The sideband signals are amplified in amplifier 8 and appear, after amplification, across terminals 9 and 11. The amplified sideband signals are also fed to rectifier circuit 21 from the output terminals of which a uni-directional voltage of magnitude proportional to the amplitude of the sideband signal is developed. The time constant of the rectifier circuit is made sufficiently long so that the magnitude of the uni-directional voltage fluctuates in dependence upon the variations in peak amplitude of the sideband signals and does not follow the modulation envelope. The uni-directional voltage has a polarity such that the grounded terminal of capacitor 23 is negative with respect to the terminal connected to resistor 22. A reverse bias voltage is thus superimposed upon the carrier wave signal voltage applied between base 17 of transistor 1 and each of electrodes 2 and 3. The magnitude of this bias voltage controls the ratio between the duration of the high impedance and low impedance periods of transistor 1. An increase of the bias voltage tends to reduce the duration of the low impedance period and, hence, tends to diminish the amplitude of the sideband signals. Since the magnitude of the bias voltage is dependent upon the amplitude of the sideband signals the modulator operates additionally as a signal level range compressor.

The combination of resistor 22 and capacitor 23 forms a low-pass filter which prevents the carrier wave signal from appearing at the output of rectifier unit 21. Capacitor 18 has a negligible reactance compared with the base-emitter impedance of transistor 1 and serves to block the bias signal from carrier wave input terminals 15 and 16.

One of the sideband signals may be selected by means of a filter circuit and the resultant single sideband amplified in an amplifier, the output signal from which is rectified and applied as bias to the base of the transistor. A D.C. component can be added to the modulating signal so that a pre-determined level of carrier wave component is present at the output terminals of the amplifier, as in a double-sideband transmission, and the sideband signals together with the carrier wave component fed to the rectifier unit.

The output signals resulting from the modulation process could be fed directly to a rectifier circuit without amplification in a further amplifier, such as amplifier 8 in the embodiment of the invention, although the sensitivity of the amplitude control would then be less for a given level of modulating signal.

Although in the embodiment of the invention described the symmetrical transistor is connected so as to be effectively in shunt with a pair of input terminals and a pair of output terminals, the principles of the invention are also applicable to an arrangement, for example as shown in FIG. 3 of the United States Patent No. 2,943,271, issued June 28, 1960, where the symmetrical transistor is connected in series between a pair of input and output terminals. In such a case it is necessary to arrange the polarity of the bias signal from the rectifier to be such that the duration of the periods during which the impedance of the transistor is low tends to decrease with increase in the level of the output signals from the modulator. The principles of the invention are also applicable to an arrangement, for example as shown in FIGS. 1 and 2 of said United States patent, in which two symmetrical transistors are used in a balanced modulator equivalent to the conventional ring modulator. In this case the same bias signal is applied to the respective base-emitter circuits of the two symmetrical transistors.

While the circuit shown in the figure is used as a modulator it can be used as a demodulator if a modulation sideband signal is applied between terminals 14 and 13, a carrier wave is applied as shown in the figure, and a filter (not shown) is used to select the demodulated output signal from secondary winding 27 of transformer 7.

Although in the embodiment of the invention described the modulating signal is in the audio frequency band and the carrier wave is at 100 kc./s., the invention is also applicable to cases where the modulating signal is outside the audio frequency band. In another embodiment of the invention in a drive unit for a transmitter the modulating frequency is 100 kc./s. and the carrier frequency is 30 mc./s.

What I claim is:

1. An electrical signal modulator including a modulating signal circuit, an output signal circuit, a symmetrical transistor having the collector and the emitter connected in shunt relation with said modulating signal circuit and said output signal circuit, a circuit arrangement to feed a carrier wave to the base of said transistor with an amplitude such that said transistor is rendered substantially conducting and non-conducting during consecutive half periods of said carrier wave, a rectifier circuit having the input thereof connected to said output signal circuit, and a circuit arrangement to feed a bias signal from the output of said rectifier circuit to the base of said transistor, said output circuit being tuned so as to select a pair of sidebands of said carrier wave.

2. An electrical signal modulator including a modulating signal circuit, an output signal circuit, a symmetrical transistor having the collector and the emitter connected in shunt relation with said modulating signal circuit and said output signal circuit, a circuit arrangement to feed a carrier wave to the base of said transistor with an amplitude such that said transistor is rendered substantially conducting and non-conducting during consecutive half periods of said carrier wave, a rectifier circuit having the input thereof connected to said output signal circuit, and a circuit arrangement to feed a bias signal from the output of said rectifier circuit to the base of said transistor, said collector and said emitter being coupled to said modulating signal circuit by a tuned circuit having a resonant frequency substantially equal to the carrier wave frequency.

3. An electrical signal modulator including a modulating signal circuit, an output signal circuit, a symmetrical transistor having the collector and the emitter connected in shunt relation with said modulating signal circuit and said output signal circuit, a circuit arrangement to feed a carrier wave to the base of said transistor with an amplitude such that said transistor is rendered substantially conducting and non-conducting during consecutive half periods of said carrier wave, a rectifier circuit having the input thereof connected to said output signal circuit, and a circuit arrangement to feed a bias signal from the output of said rectifier circuit to the base of said transistor, said modulating signal circuit including the secondary winding of a transformer and a capacitor coupled in shunt relation with said secondary winding, said secondary winding being tuned over the modulating signal frequency range by said capacitor.

4. An electrical signal modulator according to claim 1, wherein said output circuit includes a transformer having a primary winding comprising two equal windings and a capacitor to couple said two windings in series, said capacitor having a capacitance to tune said primary winding to select the pair of sidebands of said carrier wave.

5. An electrical signal modulator according to claim 3, wherein said secondary winding includes a center tap coupled to ground and said rectifier circuit and said circuit to feed said carrier wave to the base of said transistor each have one terminal connected to ground.

6. An electrical signal modulator according to claim 1, wherein said collector and said emitter are coupled to said modulating signal circuit by a tuned circuit having a resonant frequency substantially equal to the carrier wave frequency.

7. An electrical signal modulator according to claim 1, wherein said modulating signal circuit includes the secondary winding of a transformer and a capacitor coupled in shunt relation with said secondary winding, said secondary winding being tuned over the modulating signal frequency range by said capacitor.

8. An electrical signal modulator according to claim 2, wherein said modulating signal circuit includes the secondary winding of a transformer and a capacitor coupled in shunt relation with said secondary winding, said secondary winding being tuned over the modulating signal frequency range by said capacitor.

9. An electrical signal modulator according to claim 2, wherein said output circuit includes a transformer having a primary winding comprising two equal windings and a capacitor to couple said two windings in series, said capacitor having a capacitance to tune said primary winding to select the pair of sidebands of said carrier wave.

10. An electrical signal modulator according to claim 3, wherein said output circuit includes a transformer having a primary winding comprising two equal windings and a capacitor to couple said two windings in series, said capactor having a capacitance to tune said primary winding to select the pair of sidebands of said carrier wave.

References Cited

UNITED STATES PATENTS

| | | | |
|---|---|---|---|
| 2,943,271 | 6/1960 | Willis | 332—31 |
| 3,044,025 | 7/1962 | McCauley | 332—31 |
| 3,202,922 | 8/1965 | De Schamphelaere. | |
| 3,202,940 | 8/1965 | Dietrich | 332—43 |
| 3,205,458 | 9/1965 | Geery | 332—31 |

FOREIGN PATENTS

| | | |
|---|---|---|
| 851,103 | 10/1960 | Great Britain. |

ROY LAKE, *Primary Examiner.*

A. L. BRODY, *Assistant Examiner.*